United States Patent [19]

Benck et al.

[11] Patent Number: 5,136,465
[45] Date of Patent: Aug. 4, 1992

[54] PERSONAL COMPUTER WITH TANDEM AIR FLOW DUAL FANS AND BAFFLE DIRECTED AIR COOLING

[75] Inventors: Jeffrey W. Benck, Boca Raton; Mohanlal S. Mansuria, Coral Springs; Michael S. Miller, Delray Beach; Richard D. Musa, Boca Raton; Brian A. Trumbo, Boynton Beach, all of Fla.

[73] Assignee: International Business Machines Corp., Armonk, N.Y.

[21] Appl. No.: 605,051

[22] Filed: Oct. 29, 1990

[51] Int. Cl.$^5$ ............... H02B 1/56; F28F 13/06; H05K 7/20; G06F 1/00
[52] U.S. Cl. ........................... 361/384; 361/380; 361/399; 361/415; 165/122
[58] Field of Search ............. 165/122; 361/383, 384, 361/415, 380, 390–395, 399; 174/16.1; 364/708

[56] References Cited

U.S. PATENT DOCUMENTS

| | | | |
|---|---|---|---|
| 3,592,260 | 7/1971 | Berger | 361/384 X |
| 3,780,798 | 12/1973 | Reimer | 361/383 X |
| 3,840,067 | 10/1974 | Bos | 165/122 X |
| 3,903,404 | 9/1975 | Beall et al. | 165/122 X |
| 4,643,245 | 2/1987 | Smoot, III et al. | 361/384 X |
| 4,702,154 | 10/1987 | Dodson | 361/384 X |
| 4,744,005 | 5/1988 | Milani | 361/384 |
| 4,894,749 | 1/1990 | Elko et al. | 361/383 |

FOREIGN PATENT DOCUMENTS 3419688 11/1985 Fed. Rep. of Germany ...... 361/383

OTHER PUBLICATIONS

IBM Technical Disclosure Bulletin, "Minimal Air Loss Troubleshooting Card Cover", vol. 19, No. 11, Apr. 1977, De Silva et al., pp. 4110–4111.

IBM Technical Disclosure Bulletin, "Integral Edge Connector", vol. 20, No. 11A, Apr. 1978, pp. 4346–4348, Hardin.

IBM Technical Disclosure Bulletin, "Flexible Between-Board Air Baffle", vol. 21, No. 10, Mar. 1979, pp. 3989–3990, Bucher et al.

IBM Technical Disclosure Bulletin, "Industrial Computer for Class C Industrial Environments", vol. 30, No. 3, Aug. 1987, pp. 1071–1075.

Primary Examiner—Leo P. Picard
Assistant Examiner—Michael W. Phillips
Attorney, Agent, or Firm—Daniel E. McConnell

[57] ABSTRACT

This invention relates to personal computers in which provision is made for effective cooling of components capable of generating significant heat during operation, such as certain high performance microprocessors. The personal computer has an enclosure for enclosing operating components, a printed circuit board mounted within the enclosure for supporting and interconnecting operating components of the personal computer, heat generating components mounted on the printed circuit board for performing operating functions for the personal computer, a fan for inducing air to flow into the enclosure, a fan for expelling air from the enclosure, and an air flow directing baffle mounted within the enclosure in the path of air flow from one fan toward the other fan and adjacent the heat generating components for directing the flow of air through the enclosure to pass over and cool the heat generating components.

14 Claims, 4 Drawing Sheets

PERSONAL COMPUTER WITH TANDEM AIR FLOW DUAL FANS AND BAFFLE DIRECTED AIR COOLING

TECHNICAL FIELD

This invention relates to personal computers. More particularly, this invention relates to personal computers in which provision is made for effective cooling of components capable of generating significant heat during operation, such as certain high performance microprocessors.

BACKGROUND TO THE INVENTION

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are IBM's PERSONAL COMPUTER AT and IBM's PERSONAL SYSTEM/2 Models 25, 30, 50, 60, 70 and 80. These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 50 through 80. The Family I models typically have used the popular INTEL 8088 or 8086 microprocessor as the system processor. These processors have the ability to address one megabyte of memory. The Family II models typically use the high speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors.

As will be appreciated, all such personal computers are provided with enclosures which serve the multiple functions of protecting operating components of the computer, providing a pleasing appearance, and shielding against undesirable emission of electromagnetic energy. With the heat generating operating components thus enclosed, it is necessary to make provision for cooling those components in order that proper functioning continues. In particular, most very large scale integrated circuits, also known as VLSI chips, used in personal computers have operating ranges of temperature within which proper operation may be expected and is often warranted by chip manufacturers. Attempted operation outside the design temperature ranges can result in failure. Accordingly, efforts have been made to assure that proper cooling occurs.

Typically, cooling strategies for personal computers have relied upon air, and increasingly on forced air flow through the computer enclosure. A usual arrangement provides a single fan, typically mounted in or adjacent the power supply for the computer, which induces a flow of air through the enclosure and particularly through the power supply which is often the principal heat source within the enclosure. Such arrangements have achieved some success when used in the environments mentioned above as typical IBM personal computers.

More recently, attention has turned to enhancing the operation of personal computers by providing for the upgrading of existing machines through replacement of processors. Thus a machine first installed with an 80286 or 80386 processor may be upgraded to use a higher speed 80386 or a 80486 processor. However, with such an upgrade comes an increased thermal load. In many environments, the increased thermal load may be such that continued operation with the upgraded processor imposes operating temperatures which rise outside the design (and warranted) ranges.

BRIEF DESCRIPTION OF THE INVENTION

With the foregoing particularly in mind, it is an object of this invention to enhance the cooling of heat generating components enclosed within the enclosure of a personal computer. In realizing this object of the present invention, provision is made for a pair of air flow impelling fans, located upstream and downstream (in air flow relation) of the heat generating components.

Yet a further object of this invention is to enable the retrofitting of previously operated machines with higher performance processors. In realizing this object of the present invention, provision is made in an originally produced machines for the later installation of a fan and an associated baffle which assure that cooling air flow is appropriately directed over a substituted higher performance processor.

BRIEF DESCRIPTION OF THE DRAWINGS

Some of the objects of the invention having been stated, other objects will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
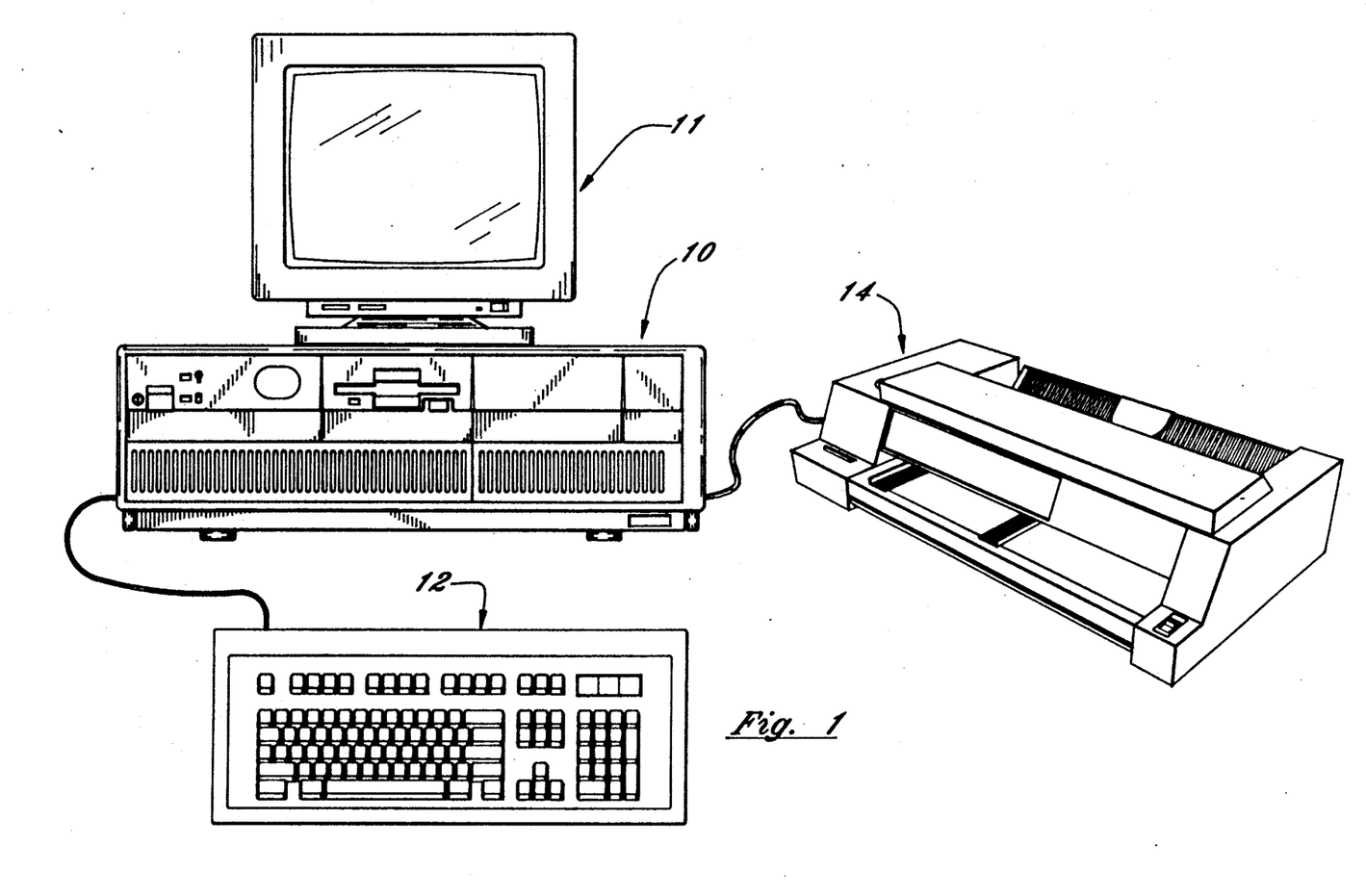
FIG. 1 is a perspective view of a personal computer embodying this invention.
Figure 2:
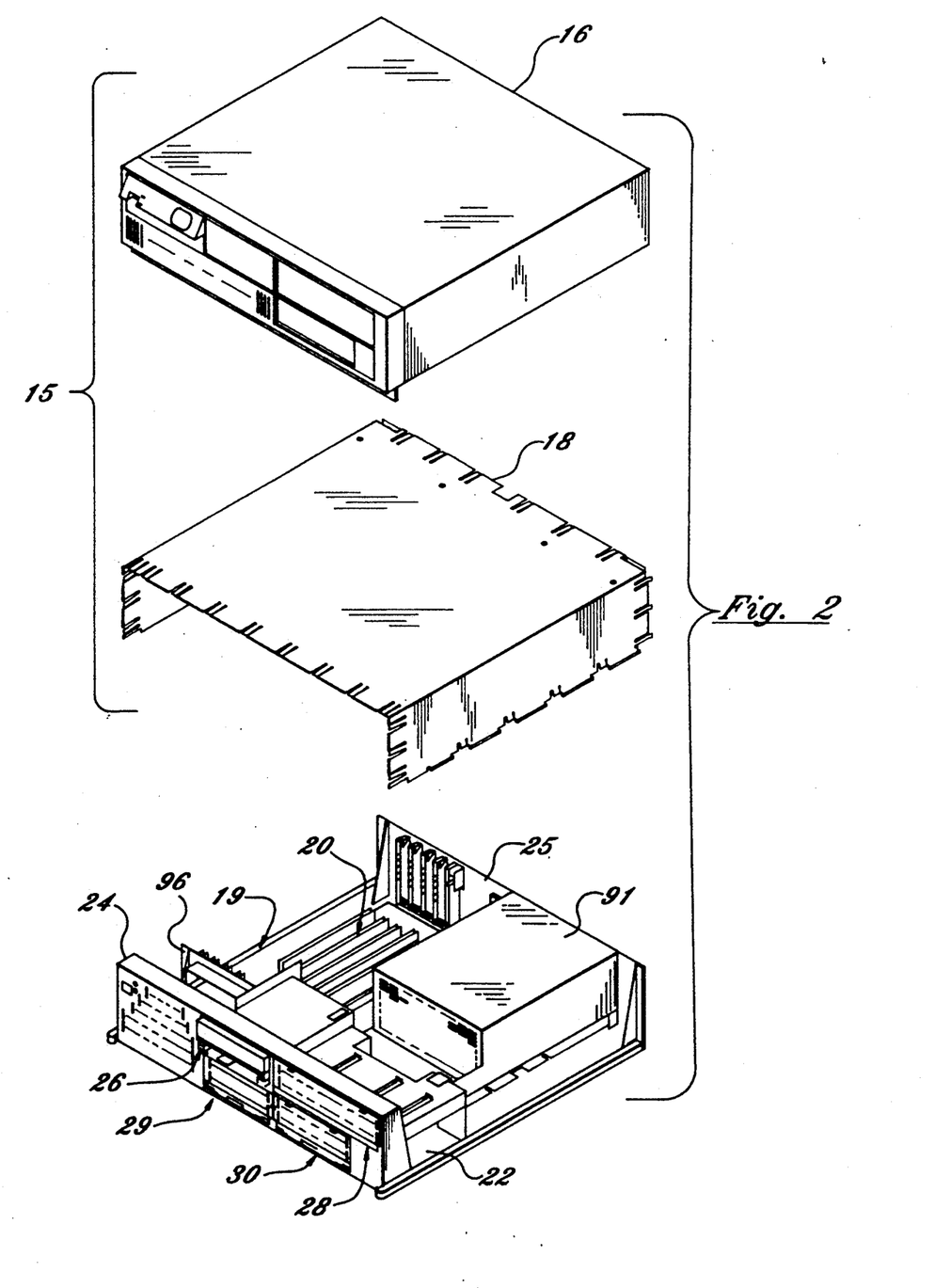
FIG. 2 is an exploded perspective view of certain elements of the personal computer of FIG. 1 including a chassis, a cover, an electromechanical direct access storage device and a planar board and illustrating certain relationships among those elements.

Referring now more particularly to the accompanying drawings, a microcomputer embodying the present invention is there shown and generally indicated at 10 (FIG. 1). As mentioned hereinabove, the computer 10 may have an associated monitor 11, keyboard 12 and printer or plotter 14. The computer 10 has a cover 15 formed by a decorative outer member 16 (FIG. 2) and an inner shield member 18 which cooperate with a chassis 19 in defining an enclosed, shielded volume for receiving electrically powered data processing and storage components for processing and storing digital data. At least certain of these components are mounted on a multilayer planar 20 or motherboard which is mounted on the chassis 19 and provides a means for electrically interconnecting the components of the computer 10 including those identified above and such other associated elements as floppy disk drives, various forms of direct access storage devices, accessory cards or boards, and the like. The chassis 19 has a base indicated at 22, a front panel indicated at 24, and a rear panel indicated at 25 (FIG. 2). The front panel 24 defines at least one open bay (and in the form illustrated, four bays) for receiving a data storage device such as a disk drive for magnetic or optical disks, a tape backup drive, or the like. In the illustrated form, a pair of upper bays 26, 28 and a pair of lower bays 29, 30 are provided. One of the upper bays 26 is adapted to receive peripheral drives of a first size (such as those known as 3.5 inch drives) while the other 28 is adapted to receive drives of a selected one of two sizes (such as 3.5 and 5.25 inch) and the lower bays are adapted to receive devices of only one size (3.5 inch).

Figure 3:
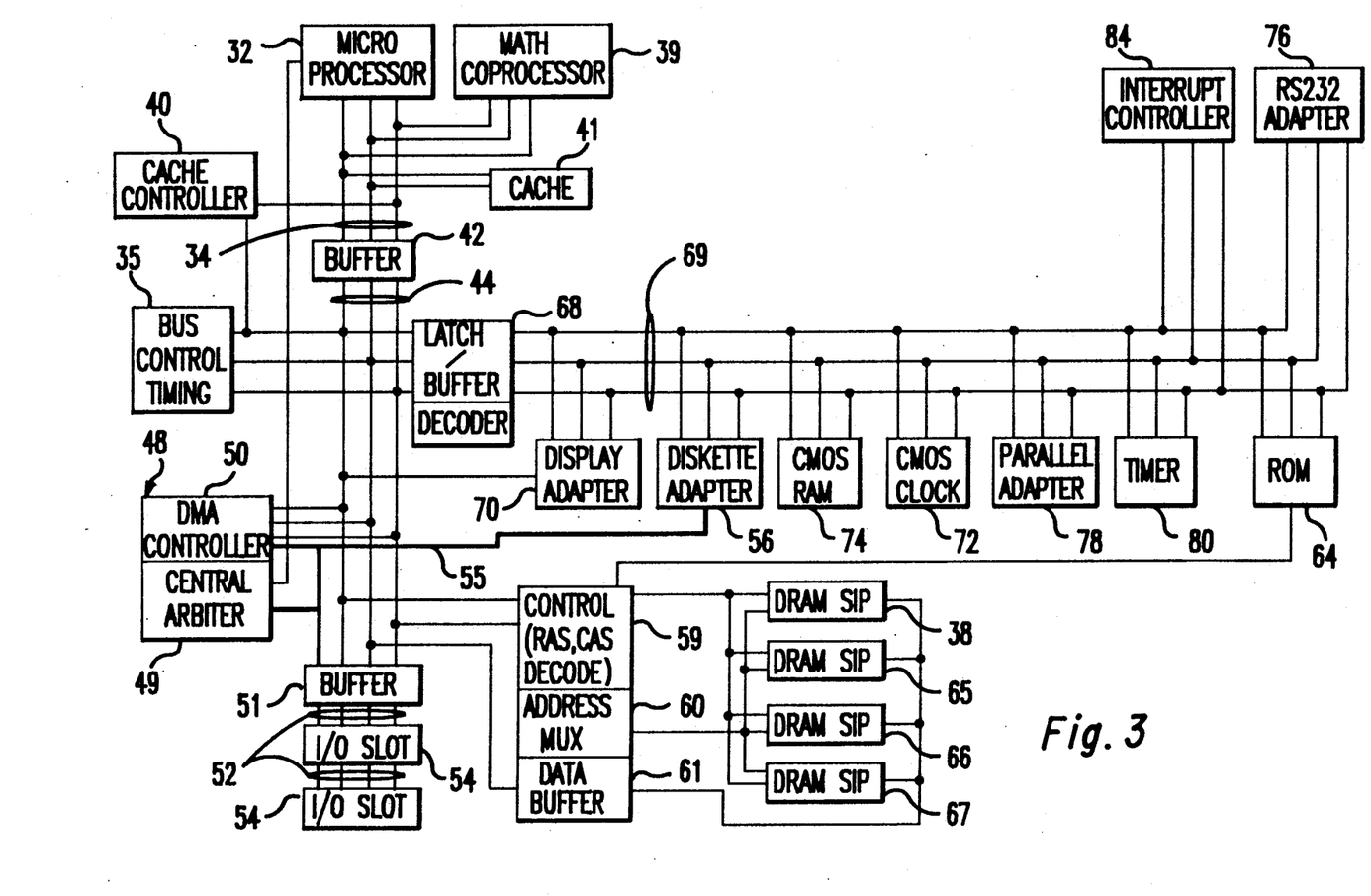
FIG. 3 is a schematic view of certain components of the personal computer of FIGS. 1 and 2.

Prior to relating the above structure to the present invention, a summary of the operation in general of the personal computer system 10 may merit review. Referring to FIG. 3, there is shown a block diagram of a personal computer system illustrating the various components of the computer system such as the system 10 in accordance with the present invention, including components mounted on the planar 20 and the connection of the planar to the I/O slots and other hardware of the personal computer system. Connected to the planar is the system processor 32 comprised of a microprocessor which is connected by a high speed CPU local bus 34 through a bus control timing unit 35 to a memory control unit 36 which is further connected to a volatile random access memory (RAM) 38. While any appropriate microprocessor can be used, one suitable microprocessor is the 80386 which is sold by INTEL.

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor could be an Intel 80386 or 80486 microprocessor. The latter, in particular, dissipates more energy as heat than do the former.

Returning now to FIG. 3, the CPU local bus 34 (comprising data, address and control components) provides for the connection of the microprocessor 32, a math coprocessor 39, a cache controller 40, and a cache memory 41. Also coupled on the CPU local bus 34 is a buffer 42. The buffer 42 is itself connected to a slower speed (compared to the CPU local bus) system bus 44, also comprising address, data and control components. The system bus 44 extends between the buffer 42 and a further buffer 68. The system bus 44 is further connected to a bus control and timing unit 35 and a DMA unit 48. The DMA unit 48 is comprised of a central arbitration unit 49 and DMA controller 50. The buffer 51 provides an interface between the system bus 44 and an optional feature bus such as the MICRO CHANNEL bus 52. Connected to the bus 52 are a plurality of I/O slots 54 for receiving MICRO CHANNEL adapter cards which may be further connected to an I/O device or memory.

An arbitration control bus 55 couples the DMA controller 50 and central arbitration unit 49 to the I/O slots 54 and a diskette adapter 56. Also connected to the system bus 44 is a memory control unit 36 which is comprised of a memory controller 59, an address multiplexor 60, and a data buffer 61. The memory control unit 36 is further connected to a random access memory as represented by the RAM module 38. The memory controller 36 includes the logic for mapping addresses to and from the microprocessor 32 to particular areas of RAM 38. This logic is used to reclaim RAM previously occupied by BIOS. Further generated by memory controller 36 is a ROM select signal (ROMSEL), that is used to enable or disable ROM 64.

While the microcomputer system 10 is shown with a basic one megabyte RAM module, it is understood that additional memory can be interconnected as represented in FIG. 3 by the optional memory modules 65 through 67. For purposes of illustration only, the present invention is described with reference to the basic one megabyte memory module 38.

A latch buffer 68 is coupled between the system bus 44 and a planar I/O bus 69. The planar I/O bus 69 includes address, data, and control components respectively. Coupled along the planar I/O bus 69 are a variety of I/O adapters and other components such as the display adapter 70 (which is used to drive the monitor 11), a CMOS clock 72, nonvolatile CMOS RAM 74 herein after referred to as NVRAM, a RS232 adapter 76, a parallel adapter 78, a plurality of timers 80, a diskette adapter 56, an interrupt controller 84, and a read only memory 64. The read only memory 64 includes the BIOS that is used to interface between the I/O devices and the operating system of the microprocessor 32. BIOS stored in ROM 64 can be copied into RAM 38 to decrease the execution time of BIOS. ROM 64 is further responsive (via ROMSEL signal) to memory controller 36. If ROM 64 is enabled by memory controller 36, BIOS is executed out of ROM. If ROM 64 is disabled by memory controller 36, ROM is not responsive to address enquiries from the microprocessor 32 (i.e. BIOS is executed out of RAM).

The clock 72 is used for time of day calculations and the NVRAM is used to store system configuration data. That is, the NVRAM will contain values which describe the present configuration of the system. For example, NVRAM contains information describing the capacity of a fixed disk or diskette, the type of display, the amount of memory, time, date, etc. Of particular importance NVRAM will contain data (can be one bit) which is used by memory controller 36 to determine whether BIOS is run out of ROM or RAM and whether to reclaim RAM intended to be used by BIOS RAM.

Furthermore, these data are stored in NVRAM whenever a special configuration program, such as SET Configuration, is executed. The purpose of the SET Configuration program is to store values characterizing the configuration of the system to NVRAM.

As mentioned hereinabove, the personal computer system 10 has a high speed system processor 32 compatible with application programs and operating system software designed to execute on slower speed system processors. The system 10 also has an enclosure formed by the cover 15 and chassis 19 for enclosing operating components of the personal computer including the high speed microprocessor 32 mounted within said enclosure which has a real and a protected mode of operation and is coupled to a high speed data bus. Non-volatile memory components 64 are mounted within the enclosure provided and electrically coupled to a slower speed data bus. The bus controller 35 mounted within the enclosure provides communications between the high speed data bus and the slower speed data bus. Volatile memory components 38 mounted within the enclosure are electrically coupled to the high speed data bus, while the memory controller 36 mounted within the enclosure and electrically coupled to the volatile and non-volatile memory 38, 64 regulates communications between the volatile memory and high speed microprocessor 32.

In accordance with the particular objects of this invention, the computer system 10 has a printed circuit board mounted within the enclosure for supporting the microprocessor and interconnecting operating components of the personal computer. In the form particularly illustrated, the microprocessor 32 is mounted on a so-called "processor card" 90, which is detachably connected with the system planar 20 in order to provide for the possibility of a system processor upgrade by simple removal and replacement of the processor card 90. The microprocessor 32 is contemplated as being a VLSI chip with a relatively high energy dissipation by release of heat.

The system 10 normally is provided with a exhaust fan (not illustrated) which is contained within the power supply portion of the system (indicated at 91). The exhaust fan is intended to expel a flow of air from within the system enclosure, and thereby hopefully draw a flow of fresh cooling air over components disposed within the enclosure. Such cooling techniques are generally well known and are described in such generally available texts as "The Winn Rosch Hardware Bible" (Brady, N.Y. 1989).

Such a power supply exhaust fan, while possibly providing cooling sufficient for a microprocessor having a relatively low level of energy dissipation by the release of heat, is insufficient for meeting the objectives of the invention here disclosed. Accordingly, the present invention contemplates the use of a pair of fans operating in tandem and with the heat generating components disposed between the fans and in predetermined relation to airflow directing baffles which assure proper cooling of components on a processor board. More particularly, the exhaust fan (here sometimes referred to as a "second" fan) which has been used heretofore continues in its known function, namely that of expelling air from the system enclosure. A first fan 94 (FIG. 4) is provided for inducing air to flow into the enclosure, and is arranged so that the discharge air stream from the first fan passes over components to be cooled and ultimately becomes an intake air flow stream to the exhaust fan.

Figure 4:
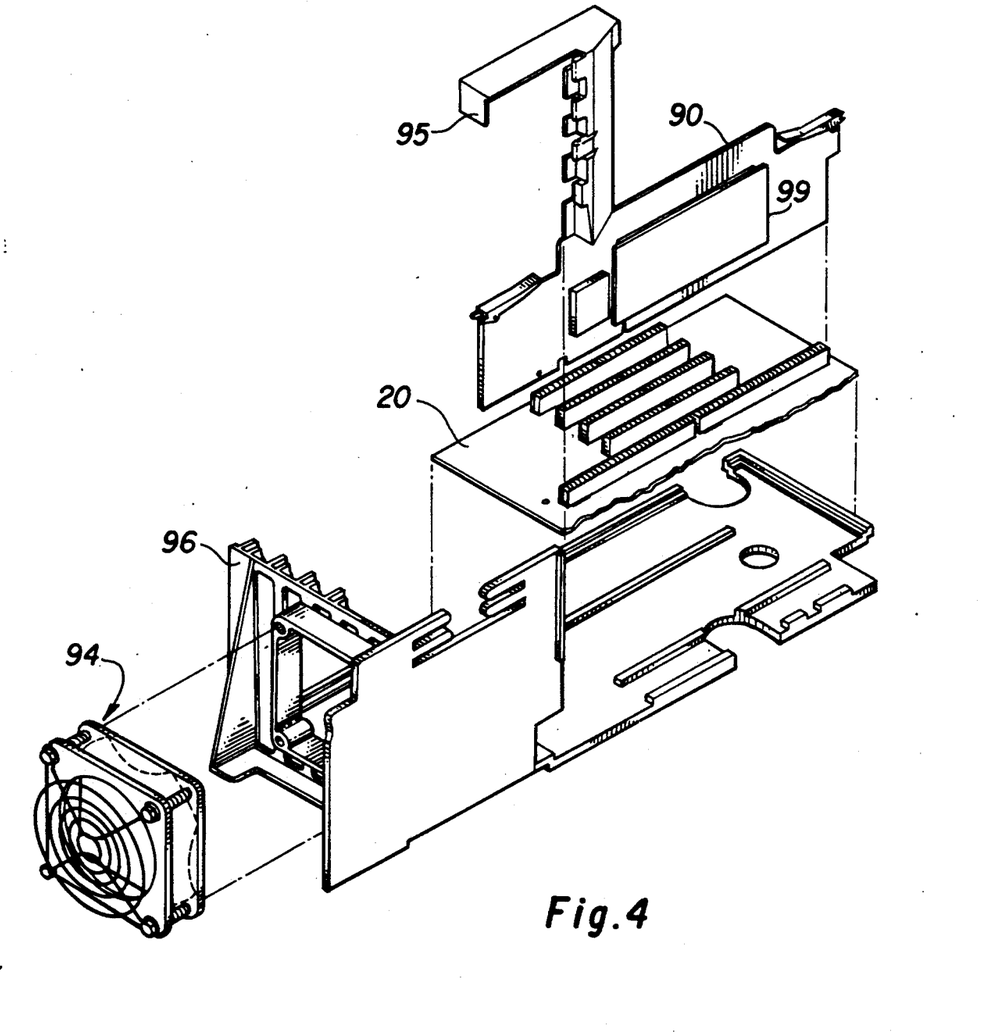
FIG. 4 is an enlarged, exploded perspective view of certain components of the personal computer of FIGS. 1 and 2, showing a fan and associated air flow guiding elements.

The designation here of a "first" fan 94 and a "second" fan within the power supply 91 is related only to the normal direction of flow contemplated in what is deemed the best mode for practice of this invention at the time of writing this description. The knowledgable reader will understand that, in terms of the sequence in which the fans may be acquired by a user who begins with an upgradeable system, the fan within the power supply 91 is the "first" fan acquired, and the fan 94 added later in an upgrade may be considered a "second" or additional fan. The reader will also understand that the direction of flow of air may be reversed from that here described, with a resulting reversal of designation. What is significant to the present invention, as brought out more fully hereinafter, is that a baffle 95 may be either interposed between the fans or used in conjunction with one of the fans. Cooling of the appropriate components on a processor board is also assured by the provision of an air flow directing baffle 95 mounted within the enclosure in the path of air flow from the fan 94 which is first in the series, taken in the direction of air flow, toward the second fan and adjacent the microprocessor 32 for directing the flow of air to pass over and cool the microprocessor. The baffle 95 is connected with a bracket 96 provided for mounting the changeable processor card within said enclosure and in predetermined relationship to the first fan 94 and baffle 95. In particular, the bracket 96 is contemplated by this invention to be configured for receiving and supporting a variety of interchangeable processor cards such as the card 90 which is specifically illustrated. With certain such cards, which may mount components dissipating lesser amounts of heat, the use of the first fan and baffle are unnecessary. With other such cards, the additional cooling is required and one, the other, or both of the fan and an appropriate baffle must be mounted on the bracket. As illustrated, the first fan 94 is secured in place on the bracket by appropriate fasteners such as screws or the like. The baffle 95 is desirably configured for the particular processor card 90 with which it is to be used, and directs air flow exiting the first fan and enroute to the second fan to pass over the heat emitting components. The baffle 95 may be secured in place by frictional engagement with the bracket 96.

As illustrated, the processor card 90 may have an optional memory "daughter" card 99 attached thereto, which may in some instances alter the distribution of air flow across the card which is desired. That is, the memory chips on the daughter card present another heat source to be cooled, and the baffle 95 should be designed to assure the desired air flow over such components.

The present invention contemplates that an upgrade processor card and the appropriate elements for assuring cooling may be provided as a kit. That is, a purchaser of a computer having a first level of performance (for example by the use of an 80286 microprocessor) may purchase an upgrade kit in order to improve the performance of the system. The performance kit may include an appropriate processor card (having an 80386 or 80486 microprocessor) and appropriate air flow guiding or impelling means. With some upgrade kits, sufficient cooling may be obtained with the inclusion of a fan alone, while others may require a baffle alone or a fan and baffle combination.

In the drawings and specifications there has been set forth a preferred embodiment of the invention and, although specific terms are used, the description thus given uses terminology in a generic and descriptive sense only and not for purposes of limitation.

What is claimed is:

1. A personal computer comprising:
    an enclosure for enclosing operating components of the personal computer,
    a printed circuit board mounted within said enclosure for supporting and interconnecting operating components of the personal computer,
    heat generating components mounted on said printed circuit board for performing operating functions for the personal computer,
    a fan mounted within said enclosure for inducing air to flow into said enclosure,
    a fan mounted within said enclosure for expelling air from said enclosure,
    a bracket mounted within said enclosure for mounting said printed circuit board within said enclosure and in predetermined relationship to the one of said fans which is nearest said printed circuit board, and
    an air flow directing baffle mounted within said enclosure in the path of air flow between said one fan and the other of said fans and adjacent said heat generating components for directing the flow of air through said enclosure to pass over and cool said heat generating components, said baffle engaging said bracket and said printed circuit board and being held in position by such engagement with said bracket and said printed circuit board.

2. A personal computer according to claim 1 wherein said heat generating components comprise a microprocessor.

3. A personal computer according to claim 1 wherein said heat generating components comprise cache memory.

4. A personal computer comprising:
    an enclosure for enclosing operating components of the personal computer,
    a printed circuit board mounted within said enclosure for supporting and interconnecting operating components of the personal computer,
    heat generating components mounted on said printed circuit board for performing operating functions for the personal computer,
    a fan mounted within said enclosure for inducing air to flow into said enclosure,
    a fan mounted within said enclosure for expelling air from said enclosure,
    a bracket mounted within said enclosure for mounting said printed circuit board within said enclosure and in predetermined relationship to the one of said fans which is nearest said printed circuit board,
    said one fan being mounted on said bracket, and
    an air flow directing baffle mounted within said enclosure in the path of air flow between said one fan and the other of said fans and adjacent said heat generating components for directing the flow of air through said enclosure to pass over and cool said heat generating components, said baffle engaging said bracket and said printed circuit board and being held in position by such engagement with said bracket and said printed circuit board.

5. A personal computer according to claim 14 wherein said first fan is mounted on said bracket.

6. A personal computer system having a high speed system processor compatible with application programs and operating system software designed to execute on slower speed system processors, said personal computer system comprising:
    an enclosure for enclosing operating components of the personal computer,
    a high speed microprocessor mounted within said enclosure and having a real and protected mode of operation coupled to a high speed data bus,
    non-volatile memory mounted within said enclosure and electrically coupled to a slower speed data bus,
    a bus controller mounted within said enclosure for providing communications between the high speed data bus and the slower speed data bus,
    volatile memory mounted within said enclosure and electrically coupled to the high speed data bus,
    a memory controller mounted within said enclosure and electrically coupled to said volatile memory and said non-volatile memory, said memory controller regulating communications between said volatile memory and said high speed microprocessor,
    a printed circuit board mounted within said enclosure for supporting said microprocessor and interconnecting operating components of the personal computer,
    a first fan mounted within said enclosure for inducing air to flow into said enclosure,
    a second fan mounted within said enclosure for expelling air from said enclosure,
    an air flow directing baffle mounted within said enclosure in the path of air flow from said first fan toward said second fan and adjacent said microprocessor for directing the flow of air through said enclosure to pass over and cool said microprocessor, and
    a bracket mounted within said enclosure for mounting said printed circuit board within said enclosure and in predetermined relationship to said first fan and said baffle,
    said baffle engaging said bracket and said printed circuit board and being held in position by such engagement with said bracket and said board.

7. A personal computer system having a high speed system processor compatible with application programs and operating system software designed to execute on slower speed system processors, said personal computer system comprising:
    an enclosure for enclosing operating components of the personal computer,
    a high speed microprocessor mounted within said enclosure and having a real and protected mode of operation and being coupled to a high speed data bus,
    non-volatile memory mounted within said enclosure and electrically coupled to a slower speed data bus,
    a bus controller mounted within said enclosure for providing communications between the high speed data bus and the slower speed data bus,
    volatile memory mounted within said enclosure and electrically coupled to the high speed data bus,
    a memory controller mounted within said enclosure and electrically coupled to said volatile memory and said non-volatile memory, said memory controller regulating communications between said volatile memory and said high speed microprocessor, a printed circuit board mounted within said enclosure for supporting said microprocessor and interconnecting operating components of the personal computer, a first fan mounted within said enclosure for inducing air to flow into said enclosure, a second fan mounted within said enclosure for expelling air from said enclosure, an air flow directing baffle mounted within said enclosure in the path of air flow from said first fan toward said second fan and adjacent said microprocessor for directing the flow of air through said enclosure to pass over and cool said microprocessor, and a bracket mounted within said enclosure for mounting said printed circuit board within said enclosure and in predetermined relationship to said first fan and said baffle, said first fan being mounted on said bracket, said baffle engaging said bracket and said printed circuit board and being held in position by such engagement with said bracket and said board.

8. A kit for a personal computer having an enclosure for enclosing operating components of the personal computer, a printed circuit board mounted within the enclosure for supporting and interconnecting operating components of the personal computer, a microprocessor components mounted on the printed circuit board for performing operating functions for the personal computer and which generates heat, a bracket mounted within the enclosure for mounting the printed circuit board, and a fan for moving air through the enclosure, the kit comprising:

a printed circuit board adapted to be substituted for the first mentioned circuit board, an upgraded microprocessor mounted on said last mentioned printed circuit board and which generates heat and is adapted to be substituted for the first mentioned microprocessor, and an air flow directing baffle for mounting within the enclosure in conjunction with substitution of said last mentioned printed circuit board and in the path of air flow through the enclosure and adjacent said upgraded microprocessor mounted on said last mentioned printed circuit board for directing the flow of air through said enclosure to pass over and cool said upgraded microprocessor, said baffle when mounted within the enclosure engaging the bracket and said last mentioned printed circuit board and being held in position by such engagement with the bracket and said last mentioned printed circuit board.

9. A personal computer comprising:

an enclosure for enclosing operating components of the personal computer, a system planar circuit board mounted within said enclosure for supporting and interconnecting operating components of the personal computer, a removable processor card circuit board mounted within said enclosure for supporting and interconnecting operating components of the personal computer, heat generating components mounted on said printed circuit boards for performing operating functions for the personal computer, said heat generating components including an upgraded microprocessor mounted on said processor card circuit board, a fan mounted within said enclosure for inducing air to flow into said enclosure, a fan mounted within said enclosure for expelling air from said enclosure, a bracket mounted within said enclosure for mounting said processor card circuit board within said enclosure and in predetermined relationship to the one of said fans which is nearest said processor card circuit board, an air flow directing baffle mounted within said enclosure in the path of air flow from one of said fans toward the other of said fans and adjacent said upgraded microprocessor for directing the flow of air through said enclosure to pass over and cool said upgraded microprocessor, said baffle engaging said bracket and said processor card circuit board and being held in position by such engagement with the bracket and said processor card circuit board.

10. A personal computer system having a high speed system processor compatible with application programs and operating system software designed to execute on slower speed system processors, said personal computer system comprising:

an enclosure for enclosing operating components of the personal computer, a system planar circuit board mounted within said enclosure for supporting and interconnecting operating components of the personal computer, a removable processor card circuit board mounted within said enclosure for supporting and interconnecting operating components of the personal computer, a high speed microprocessor mounted on said processor card circuit board and having a real and protected mode of operation coupled to a high speed data bus, non-volatile memory mounted on said system planar circuit board and electrically coupled to a slower speed data bus, a bus controller mounted on said system planar circuit board for providing communications between the high speed data bus and the slower speed data bus, volatile memory mounted on said system planar circuit board and electrically coupled to the high speed data bus, a memory controller mounted on said system planar circuit board and electrically coupled to said volatile memory and said non-volatile memory, said memory controller regulating communications between said volatile memory and said high speed microprocessor, a fan mounted within said enclosure for inducing air to flow into said enclosure, a fan mounted within said enclosure for expelling air from said enclosure, a bracket mounted within said enclosure mounting said processor card circuit board within said enclosure and in predetermined relationship to the one of said fans which is nearest said processor card circuit board, and an air flow directing baffle mounted within said enclosure in the path of air flow from said first fan toward said second fan and adjacent said microprocessor for directing the flow of air through said enclosure to pass over and cool said microprocessor, said baffle engaging said bracket and said processor card circuit board and being held in position by such engagement with the bracket and said processor card circuit board.

11. A kit for a personal computer having an enclosure for enclosing operating components of the personal computer, a printed circuit board mounted within the enclosure for supporting and interconnecting operating components of the personal computer, a microprocessor mounted on the printed circuit board for performing operating functions for the personal computer and which generates heat, a bracket mounted within the enclosure for mounting the printed circuit board, and a fan for moving air through the enclosure, the kit comprising:

a printed circuit board adapted to be substituted for the first mentioned circuit board, an upgraded microprocessor mounted on said last mentioned printed circuit board and which generates heat and is adapted to be substituted for the first mentioned microprocessor, a fan for mounting within the enclosure in conjunction with substitution of said last mentioned printed circuit board and for inducing air to flow through the enclosure to pass over and cool said upgraded microprocessor, and an air flow directing baffle for mounting within the enclosure in conjunction with substitution of said last mentioned printed circuit board and in the path of air flow through the enclosure and adjacent said upgraded microprocessor mounted on said last mentioned printed circuit board for directing the flow of air through said enclosure to pass over and cool said upgraded microprocessor, said baffle when mounted within the enclosure engaging the bracket and said last mentioned printed circuit board and being held in position by such engagement with the bracket and said last mentioned printed circuit board.

12. A kit for a personal computer having an enclosure for enclosing operating components of the personal computer, a printed circuit board mounted within the enclosure for supporting and interconnecting operating components of the personal computer, operating components mounted on the printed circuit board for performing operating functions for the personal computer and which generate heat, a bracket mounted within the enclosure for mounting the printed circuit board, and a fan for moving a flow of air along a path of air flow through the enclosure, the kit comprising:

a fan mountable within the enclosure for inducing a flow of air along the path of air flow through the enclosure, and an air flow directing baffle mountable within the enclosure in the path of air flow between said last mentioned fan and the first mentioned fan and adjacent the operating components for directing the flow of air through the enclosure to pass over and cool the operating components, said baffle when mounted within the enclosure engaging the bracket and the printed circuit board and being held in position by such engagement with the bracket and the printed circuit board.

13. A kit for a personal computer having an enclosure for enclosing operating components of the personal computer, a printed circuit board mounted within the enclosure for supporting and interconnecting operating components of the personal computer, operating components mounted on the printed circuit board for performing operating functions for the personal computer and which generate heat, a bracket mounted within the enclosure for mounting the printed circuit board, and a fan for moving a flow of air along a path of air flow through the enclosure, the kit comprising:

a printed circuit board adapted to be substituted for the first mentioned circuit board, operating components mounted on said last mentioned printed circuit board and which generate heat, a fan for mounting within the enclosure in conjunction with substitution of said last mentioned printed circuit board and for inducing a flow of air along the path of air flow through the enclosure, and an air flow directing baffle for mounting within the enclosure in conjunction with substitution of said last mentioned printed circuit board and in the path of air flow between said last mentioned fan and the first mentioned fan and adjacent said operating components mounted on said last mentioned printed circuit board for directing the flow of air through the enclosure to pass over and cool said last mentioned operating components, said baffle when mounted within the enclosure engaging the bracket and said last mentioned printed circuit board and being held in position by such engagement with the bracket and said last mentioned printed circuit board.

14. A kit for a personal computer having an enclosure for enclosing operating components of the personal computer, a printed circuit board mounted within the enclosure for supporting and interconnecting operating components of the personal computer, operating components mounted on the printed circuit board for performing operating functions for the personal computer and which generate heat, a bracket mounted within the enclosure for mounting the printed circuit board, and a fan for moving a flow of air along a path of air flow through the enclosure, the kit comprising:

a printed circuit board adapted to be substituted for the first mentioned circuit board, operating components mounted on said last mentioned printed circuit board and which generate heat, and an air flow directing baffle for mounting within the enclosure in conjunction with substitution of said last mentioned printed circuit board and in the path of air flow through the enclosure and adjacent said operating components mounted on said last mentioned printed circuit board for directing the flow of air through said enclosure to pass over and cool said last mentioned operating components, said baffle when mounted within the enclosure engaging the bracket and said last mentioned printed circuit board and being held in position by such engagement with the bracket and said last mentioned printed circuit board.

* * * * *